3,418,242
REFRIGERANT COMPOSITION

Bernhardt J. Eiseman, Jr., Wilmington, Del., assignor to E. I. du Pont de Nemours and Company, Wilmington, Del., a corporation of Delaware
No Drawing. Filed May 18, 1965, Ser. No. 456,840
1 Claim. (Cl. 252—67)

---

ABSTRACT OF THE DISCLOSURE

Substantially azeotropic compositions consisting of 15 to 95% by weight of bromotrifluoromethane and 85% to 5% by weight of difluoromethane; useful as refrigerants and advantageous due to their high critical temperature and increased refrigeration capacity.

---

This invention is directed to novel compositions useful as refrigerants.

A continuing problem in refrigeration is that there exists only a limited number of properly low boiling liquified gases having properties suitable for refrigeration purposes. In addition to being low boiling, other important properties which a useful refrigerant must possess are low toxicity, non-flammability, freedom from odor, high chemical and thermal stability.

Many methane derivatives having mixed fluorine and chlorine or mixed fluorine and bromine substituents possess the required properties and thus have become well established as useful refrigerants. Bromotrifluoromethane, for example, is a well-established refrigerant boiling at −72° F. at one atmosphere pressure (14.7 lbs./sq. in.). The next lower boiling common refrigerant of this class of fluorohalomethanes is chlorothrifluoromethane with a boiling point of −115° F. at atmospheric pressure. Hexafluoroethane, with a normal boiling point of −109° F. at atmospheric pressure, could also be used as a refrigerant. No refrigerant, however, is currently available which has the required properties for a useful refrigerant as the aforementioned fluorohalomethanes and boils within the range of −72° F. and −109° F. Refrigerants operable within the temperature range of −72° F. to −109° F. would be useful for maintaining temperatures within this range in storage freezers and environmental chambers. It is well known that frozen foods keep longer and better the lower the temperature at which they are stored and that their quality is improved by rapid freezing. Studies using low temperature environmental chambers, such as studies of crystallization, tempering, space, and conditions existing in the arctic and antarctic are also seriously limited by the lack of a refrigerant having a normal boiling point between −72° F. and −109° F. Therefore, filling this gap between bromotrifluoromethane and hexafluoroethane in the series of available refrigerants would fill a distinct need and significantly expand the flexibility of refrigeration systems.

It is, therefore, an object of this invention to provide a refrigerant for use at temperatures lower than those for which bomotrifluoromethane is suitable.

It is another object of this invention to provide a refrigerant useful within a temperature range between −72° F. and −100° F.

It is still another object to provide a process of refrigeration characterized by the use of refrigerants with normal boiling points in the vicinity of −76° F. to −83° F.

These and other objects wil become apparent from the following description and claim.

More specificaly, the present invention is directed to a novel azeotrope-like composition consisting of 15% to 95% by weight of bromotrifluoromethane and 85% to 5% by weight of difluoromethane, and more particularly to an azeotropic composition within the aforementioned composition consisting of from about 80% by weight of bromotrifluoromethane and about 20% by weight of difluoromethane.

Difluoromethane has a normal boiling point of −61° F. at atmospheric pressure. Although possessing some characteristics favorable for a refrigerant, difluoromethane is not used as such because it is flammable. Bromotrifluoromethane is nonflammable and is employed as a refrigerant at temperatures appropriate to its boiling point of −72° F.

It has recently been discovered that these compounds in mixtures with each other exhibit a significant and unexpected mutual raising of their respective vapor pressures which produces a corresponding marked and unusual lowering of their boiling points. The depth to which the boiling points are reduced reaches a minimum at −83° F. when 80% by weight of bromotrifluoromethane is mixed with 20% by weight of difluoromethane. This mixture is established as an azeotrope, since the mixture with its minimum boiling point yields a distillate of the same composition as the mixture, and no change in properties of the mixture or the distillate occurs with evaporation. Furthermore, this marked depression of the boiling points extends over a wide range of compositions of the components of the azeotrope. For example, compositions varying from that which contains 15% of bromotrifluoromethane and 85% difluoromethane to that which has 95% of bromotrifluoromethane and 5% of difluoromethane (amounts by weight in each case) boil at one atmosphere pressure within the temperature range of about −76° F. to −83° F. The compositions within these limits are nonflammable. It is indeed surprising that 15% of bromotrifluoromethane in difluoromethane renders the latter free from ignition and burning.

The compositions of this invention have the important advantage of higher critical temperatures (142° F. and above) over chlorotrifluoromethane (84° F.) and hexafluoroethane (68° F.), resulting in favorable properties for condensation in the refrigeration cycle. For example, it is necessary to use refrigeration to condense chlorotrifluoromethane or hexafluoroethane, whereas the compositions of this invention can be condensed with cooling water or even, under favorable conditions, by air cooling.

The refrigerants of this invention may in general be used in refrigeration systems designed for use with bromotrifluoromethane. The refrigerants of this invention, however, due to their boiling points being substantially below the boiling point of bromotrifluoromethane, have increased refrigeration capacity when used in such machines. Thus, on the same temperature cycle, more moles of gas of the invention composition will be pumped to provide a larger cooling capacity with the same compressor running at the same speed. Chlorotrifluoromethane cannot be interchanged with bromotrifluoromethane in the same compressor because on a temperature cycle suitable for bromotrifluoromethane the design pressure would be far exceeded and the compression ratio impractically large with chlorotrifluoromethane. With any given compressor the invention azeotropic composition provides substantially more cooling capacity than bromotrifluoromethane. For example, it offers this greater cooling capacity at higher efficiency with evaporator temperatures from −40° F. to −70° F. and a condensing temperature of 95° F. and a return gas temperature of 20° F. as shown in Table I.

The same is true to a considerable degree of the other compositions of this invention.

TABLE I
Calorimeter Data Comparing Compressor Capacity and Performance Factor of the Azeotrope $CBrF_3/CH_2F_2$ (80/20 by Weight) and Pure $CBrF_3$ at Various Evaporator Temperatures Condensing temperature: +95° F.
Return gas temperature: +20° F.

(A)

| Evaporator Temp., ° F. | Compressor Capacity, B.t.u./hr. | | Ratio-Azeotrope to $CBrF_3$ |
|---|---|---|---|
| | $CBrF_3/CH_2F_2$ 80/20 | $CBrF_3$ | |
| −70 | 4,160 | 3,057 | 1.36 |
| −60 | 8,290 | 6,032 | 1.37 |
| −40 | 18,000 | 13,059 | 1.38 |

(B)

| Evaporator Temp., ° F. | Performance Factor, B.t.u./Watt-hr. | | Ratio-Azeotrope to $CBrF_3$ |
|---|---|---|---|
| | $CBrF_3/CH_2F_2$ 80/20 | $CBrF_3$ | |
| −70 | 1.50 | 1.36 | 1.10 |
| −60 | 2.30 | 2.06 | 1.12 |
| −40 | 3.37 | 3.13 | 1.08 |

The ratio of compression of the invention azeotrope is similar to that of bromotrifluoromethane and much lower than that of difluoromethane. For example, the ratio of compression for a −60° F. evaporator and a +90° F. condenser is 13.9 for bromotrifluoromethane, 14.0 for the azeotrope and 19.7 for difluoromethane. On the other hand, the temperature rise on compression of the azeotrope is greater than that for bromotrifluoromethane. For example, in calorimeter unit tests under the same operating conditions as in Table I, at an evaporator temperature of −70° F., the temperature reached on compression of the azeotrope was 351° F. compared with 315° F. for bromotrifluoromethane. Such a difference is, in general, an unimportant penalty to pay for the large advantage in increased cooling capacity. If it is desirable, however, to reduce the temperature rise on compressing the azeotrope, for example, in case a low evaporator temperature is required and the advantages of single stage compression are to be realized, then higher proportions of bromotrifluoromethane may be used in the bromotrifluoromethane/difluoromethane mixture. As a result, the heat of compression will be more nearly that of bromotrifluoromethane and many of the advantages of the azeotrope over bromotrifluoromethane will be retained. The cause for such retention of advantages is that the azeotrope boils much lower than bromotrifluoromethane and when, for example, only half as much difluoromethane as exists in the azeotrope is present, the normal boiling point of the mixture is still much below that of bromotrifluoromethane. Other conditions and needs that may require a minimum rise in temperature upon compression of the gas include the protection of electrical insulation and improvement of the performance of lubricants.

On the other hand, when the heat of compression is unimportant, for example, at relatively low ratios of compression or at high ratios of compression when electrical insulation resistant to higher temperatures is used and lubricants that perform satisfactorily under heat have been selected, economic considerations may dictate the use of high proportions of difluoromethane in the bromotrifluoromethane/difluoromethane composition. Difluoromethane is potentially lower in cost per pound than bromotrifluoromethane, and less weight of it is required for a charge of a given piece of refrigeration equipment. Up to 85% by weight of difluoromethane may be used in the composition while large advantages over 100° bromotrifluoromethane are retained. Compared with flammable pure difluoromethane, the mixture with 85% difluoromethane is nonflammable and has a significantly higher vapor pressure and lower boiling point.

Thus, the invention compositions are well adapted for use as refrigerants of normal boiling point between the temperature range from about −76° F. to about −83° F. to effect cooling for refrigeration or freezing. The useful refrigerant range for the compositions of this invention extend down to −100° F. and below. Cooling with the compositions of this invention is accomplished by a process for transferring heat in a repeated cycle of evaporating, compressing, and condensing the mixtures of bromotrifluoromethane and difluoromethane of this invention in a closed system.

Bromotrifluoromethane may be prepared by passing a gaseous mixture of bromine and trifluoromethane over activated chromium (III) oxide at 400° C. as described in U.S. Patent 2,937,210. Difluoromethane may be produced by heating at about 130° C. a mixture of dichloromethane and anhydrous hydrogen fluoride in the presence of antimony trichloride and pentachloride as illustrated in U.S. Patent 2,749,374.

The range of compositions of bromotrifluoromethane and difluoromethane effective for use as novel refrigerants having a normal boiling point within the range −76° F. to −83° F. is defined by vapor pressure/temperature data, the boiling point/composition relation, and the results of flammability tests. The vapor pressures of mixtures of bromotrifluoromethane and difluoromethane at temperatures selected for convenience of experimental manipulation are given below in Table II.

TABLE II
Vapor Pressure, lbs./in.$^2$ Absolute, of $CBrF_3/CH_2F_2$ Compositions

| Temp., ° F. | Composition ($CBrF_3/CH_2F_2$) (parts by weight) | | | | | | | |
|---|---|---|---|---|---|---|---|---|
| | 100/0 | 95/5 | 85/15 | 80/20 | 75/25 | 35/65 | 15/85 | 0/100 |
| 32.9 | 124.3 | 151.0 | 167.0 | *170.0* | 169.8 | 162.0 | 155.5 | 128.0 |
| 4.1 | 76.5 | 90.5 | 103.0 | *104.0* | 103.8 | 98.5 | 94.8 | 70.0 |
| −16.0 | 52.6 | 65.5 | 70.2 | *71.0* | 70.9 | 67.0 | 64.0 | 46.0 |
| −40.0 | 31.9 | 39.0 | 43.1 | *43.6* | 43.5 | 40.7 | 38.7 | 26.7 |
| −60.0 | 20.0 | 24.0 | 26.8 | *27.1* | 27.0 | 25.9 | 23.9 | 15.2 |

The composition having the highest vapor pressure at a given temperature is italicized and thus marked as the azeotropic composition. In each set of data for a given temperature this composition contains about 80% by weight of bromotrifluoromethane and about 20% by weight of difluoromethane. Compositions having no more than about a 13% lower vapor pressure than the azeotrope lie within the range of 95/5 to 15/85 bromotrifluoromethane/difluoromethane and provide refrigerants suitable for use in evaporation, compression, and condensation cooling systems at a significantly lower temperature than bromotrifluoromethane, or with a significantly higher compressor capacity on the same temperature cycle. At atmospheric pressure (14.7 lbs./in.$^2$) the boiling points of different compositions are as shown in Table III.

TABLE III

Composition, $CBrF_3/CH_2F_2$,
parts by wt.:                               Boiling point, ° F.
100/0 _____ −72.0
95/5 _____ −77.5
90/10 _____ −80.0
85/15 _____ −82.0
80/20 _____ −83.0
75/25 _____ −83.0
35/65 _____ −80.0
15/85 _____ −76.0
0/100 _____ −61.0

The 80/20 trifluorobromomethane/difluoromethane composition exhibits a minimum boiling point relative to its two components, and the compositions within the 95/5 to 15/85 range have normal boiling points essentially within the range −76° F. to −83° F. The compositions within the 90/10 to 35/65 range all have boiling points of −80° F. or below and hence are preferred compositions of this invention.

When a mixture containing 91% by weight of bromotrifluoromethane and 9% by weight of difluoromethane was subjected to careful fractionation, there was obtained, as the lowest boiling material, the azeotrope boiling at −85° F. Analysis by the mass spectrograph showed the azeotrope contained 80% by weight of bromotrifluoromethane and 20% by weight of difluoromethane. The azeotrope continued to distill until the difluoromethane was exhausted from the mixture in the still whereupon pure bromotrifluoromethane distilled.

Although difluoromethane is readily ignited, mixtures of bromotrifluoromethane and difluoromethane containing down to 15% by weight of the bromo compound are nonflammable in air at room temperature and at 100° C. Flammability tests were conducted to determine these limits, and the results of these tests are set forth in Table IV below. One of the tests used to determine these limits is described in Underwriters Laboratories' Miscellaneous Hazard Report No. 2375, p. 97 (Nov. 13, 1933).

TABLE IV

Composition, $CBrF_3/CH_2F_2$, parts by wt.:

| Composition | Flammability |
|---|---|
| 0/100 | Ignited. |
| 5/95 | Ignited. |
| 15/85 | No ignition. |
| 20/80 | No ignition. |
| 25/75 | No ignition. |

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments described herein.

The embodiments of the invention in which an exclusive property or privilege is claimed are defined as follows.

I claim:
1. An azeotrope consisting of about 80% by weight bromotrifluoromethane and about 20% by weight difluoromethane.

References Cited

UNITED STATES PATENTS

| | | | |
|---|---|---|---|
| 2,531,373 | 11/1950 | Waterman | 252—67 X |
| 3,173,872 | 3/1965 | Broadley et al. | 252—67 |

LEON D. ROSDOL, *Primary Examiner.*

S. D. SCHWARTZ, *Assistant Examiner.*